UNITED STATES PATENT OFFICE.

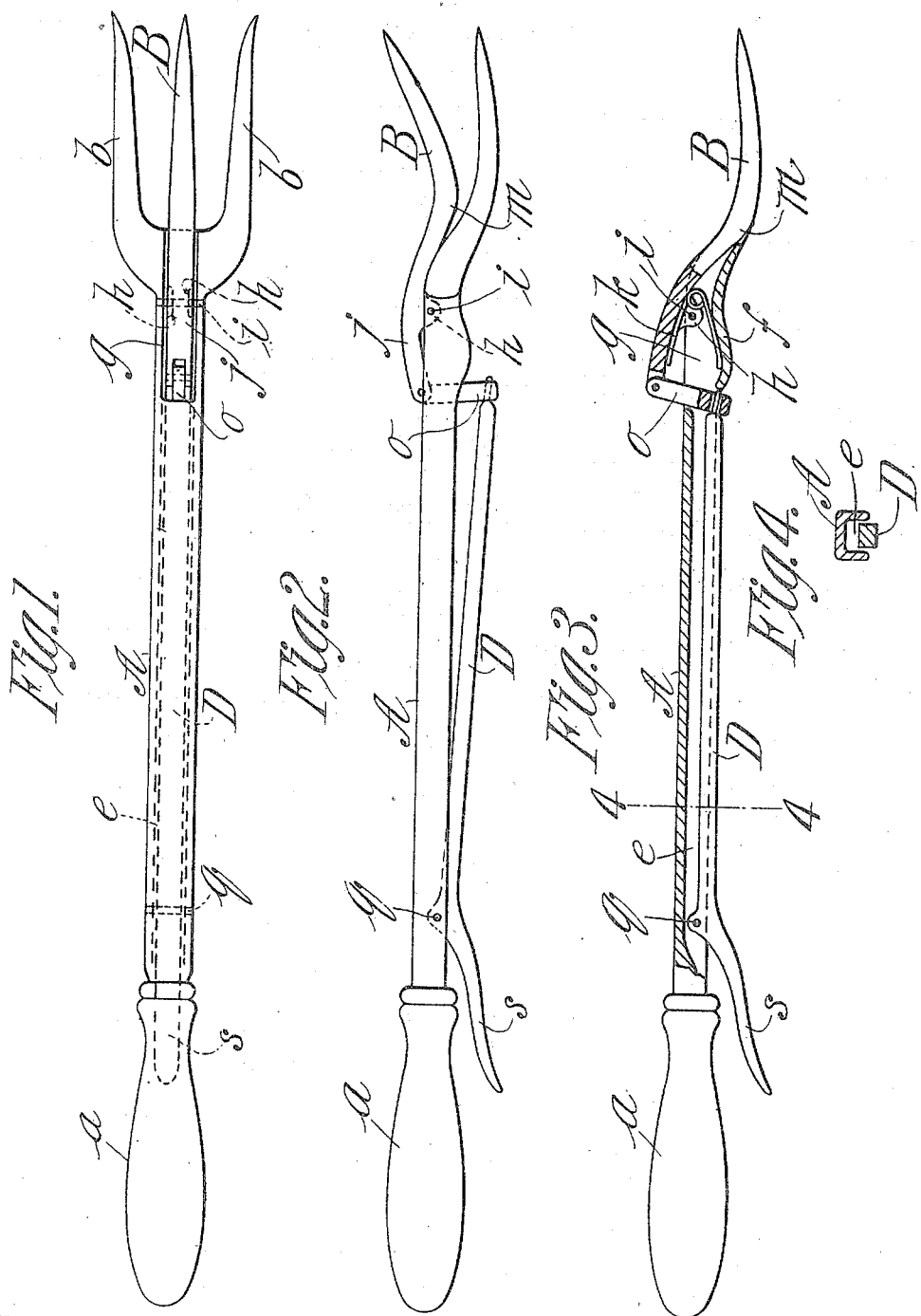

ALFRED O. BONIN AND LOUIS P. BEAULIEAU, OF HOLYOKE, MASSACHUSETTS.

FORK.

950,835.  Specification of Letters Patent.  Patented Mar. 1, 1910.

Application filed September 17, 1909. Serial No. 518,176.

*To all whom it may concern:*

Be it known that we, ALFRED O. BONIN and LOUIS P. BEAULIEAU, citizens of the United States of America, and residents of Holyoke, in the county of Hampden and State of Massachusetts, have invented certain new and useful Improvements in Forks, of which the following is a full, clear, and exact description.

The especial object of this invention is to provide a fork having the tines so constructed and adapted that they may be thrust into a somewhat heavy piece of meat being cooked, one of the tines which is pivotally jointed on the forward end of the fork shank being forced transversely from its normal position in the plane of the other tine whereby the several tines of the fork impart such a tension on the piece of meat that the latter may be lifted from the pan or vessel in which it is being cooked and carried on the fork with no liability of its displacement.

The invention is described in conjunction with the accompanying drawings and is set forth in the claims.

In the drawings:—Figure 1 is a plan view of the improved fork; Fig. 2 is a side elevation of the fork showing the pivotally mounted tine as forced to its position transversely removed from and angular to the fixed tines. Fig. 3 is substantially a central vertical longitudinal section through the fork, the pivoted tine being represented as in its normal position. Fig. 4 is a cross section on line 4—4, Fig. 3.

In the drawings, A represents the shank of the fork having at its rear end a handle $a$ and having at its forward end a pair of separated fixed tines $b$ $b$. The said shank has a longitudinal channel $e$ along its under side extending from its rear portion adjacent the handle nearly to its forward end; and the shank is made at its forward extremity with a web $f$ uniting the opposite side portions of the shank which at its forward extremity is constructed with an upwardly opening recess $g$.

B represents the pivotally connected and movable tine having its location between and normally in the same plane with the fixed tine $b$ $b$. This tine B has an ear piece $h$ (or duplicated ear pieces) located in the said recess $g$ and connected to the shank by the cross pivot or rivet $i$; and the said pivotally mounted tine is provided with a rearwardly extended lever arm $j$; and a spring $k$ is applied in compression between the lever arm of the tine $b$ and the aforementioned web $f$ to maintain such tine $b$ in plane with the fixed tines, the limitation of its swinging movement in one direction being insured by the forward end portion of the aforesaid web $f$ which terminates at such a location as to constitute an abutment for the heel portion $m$ of the pivoted tine.

$o$ represents a short bar having its upper end pivotally connected to the rear end of the rearwardly extending lever extension of the tine and extending into and more or less through the channel in the fork shank at a location just to the rear of the web $f$.

D represents a lever normally located in the said longitudinal channel $e$ and intermediately jointed by the pivot $q$ to the fork shank, this lever having its forward end jointed to or in engagement with the lower end of the bar $o$ while its extremity rearwardly of the pivot $q$ is formed to constitute a thumb piece $s$ which underlies and is in proximity to the fork handle.

In the use of this implement the fork is, while all of its tines are alongside each other or in substantially the same plane, thrust into a piece of meat or other object to be lifted and moved whereupon by a thumb or finger pressure on the lever extension $s$ the pivoted tine is swung transversely from its normal location and angular to the general plane of the other tines for a dilating tension on the piece of meat; and, as manifest, so long as the pressure on the part $s$ is manually maintained, the engagement of the fork tines in the piece penetrated thereby is assured, and the liability of displacement of such piece off from the fork is guarded against.

We claim:—

1. A fork comprising a shank having at its forward end a plurality of fixed tines, and a tine of the same configuration as the fixed tines pivotally mounted on the forward end of the shank, and having its location between the fixed tines, means for normally maintaining the pivoted tine in the plane of the fixed tines, and means for swinging the pivoted tine in a direction transversely to the plane of said fixed tines.

2. A fork comprising a handle provided shank having at its forward end a plurality of fixed tines, and a tine of the same configuration as the fixed tines pivotally mounted on the forward end of the shank, and extending between the fixed tines, and provided with a rearwardly extended lever arm, a lever intermediately pivotally connected to the fork shank and by its forward end connected to the rearwardly extended lever arm of said pivoted tine, and having a thumb piece rearwardly extending from its pivot into proximity to the fork handle, and a spring for maintaining the pivoted tine normally in plane with the fixed tines.

3. A fork comprising a handle provided shank having at its forward end a pair of fixed tines and said shank having a longitudinal channel along its under side extending nearly to its forward end and having a web at its forward extremity uniting the opposite side portions of the shank and constructed with an upwardly opening recess above the said web, a tine having an ear piece located in said recess and pivotally connected to the forward portion of the shank and provided with a rearwardly extending lever arm, a spring in the said recess and reacting between the said web and said lever arm, a bar having its upper end pivotally connected to the rear end of the said lever arm, and extending into said longitudinal channel to the rear of said web and another lever normally located in the said longitudinal channel and intermediately pivotally connected to the fork shank having its forward end jointed to the lower end of said bar and having its extremity rearwardly of its pivot and constituting a thumb piece in proximity to the fork handle.

Signed by us at Springfield, Mass., in presence of two subscribing witnesses.

ALFRED O. BONIN.
LOUIS P. BEAULIEAU

Witnesses:
G. R. DRISCOLL,
WM. S. BELLOWS.